United States Patent
Inoue et al.

(12) 
(10) Patent No.: US 6,280,536 B1
(45) Date of Patent: Aug. 28, 2001

(54) FE BASED HARD MAGNETIC ALLOY HAVING SUPER-COOLED LIQUID REGION

(75) Inventors: Akihisa Inoue; Kouichi Fujita; Katsuhiro Fujita, all of Miyagi-ken (JP)

(73) Assignees: Alps Electric Co., Ltd., Tokyo; Akihisa Inoue, Miyagi-ken; Toda Kogyo Corp., Hiroshima-ken, all of (JP)

( * ) Notice: Subject to any disclaimer, the term of this patent is extended or adjusted under 35 U.S.C. 154(b) by 0 days.

(21) Appl. No.: 09/047,739

(22) Filed: Mar. 25, 1998

(30) Foreign Application Priority Data

Mar. 25, 1997 (JP) .................................................. 9-072472

(51) Int. Cl.[7] .................................................... H01F 1/057
(52) U.S. Cl. ............................. 148/302; 420/83; 420/121
(58) Field of Search ............................... 148/302; 420/83, 420/121

(56) References Cited

U.S. PATENT DOCUMENTS

| | | | |
|---|---|---|---|
| 5,049,208 | * | 9/1991 | Yajima et al. ........................ 148/302 |
| 5,089,065 | | 2/1992 | Hamano et al. ...................... 148/302 |
| 5,194,098 | * | 3/1993 | Sagawa et al. ....................... 148/302 |
| 5,449,417 | * | 9/1995 | Shimizu et al. ...................... 148/302 |
| 5,466,308 | * | 11/1995 | Fujimura et al. ..................... 148/302 |
| 5,674,327 | * | 10/1997 | Yamamoto et al. .................. 148/302 |
| 5,690,752 | * | 11/1997 | Yamamoto et al. .................. 148/302 |

FOREIGN PATENT DOCUMENTS 08153986A  6/1996  (JP) .

* cited by examiner

Primary Examiner—John Sheehan
(74) Attorney, Agent, or Firm—Brinks Hofer Gilson & Lione

(57) ABSTRACT

The present invention provides a Fe based hard magnetic alloy having a very wide temperature interval in the super-cooled liquid region, having a hard magnetism at room temperature, being able to be produced thicker than amorphous alloy thin films obtained by conventional liquid quenching methods, and having a high material strength, wherein the Fe based hard magnetic alloy comprises Fe as a major component and containing one or a plurality of elements R selected from rare earth elements, one or a plurality of elements M selected from Ti, Zr, Hf, V, Nb, Ta, Cr, Mo, W and Cu, and B, the temperature interval $\Delta T_x$ in the super-cooled liquid region represented by the formula of $\Delta T_x = T_x - T_g$ (wherein $T_x$ and $T_g$ denote a crystallization initiation temperature and glass transition temperature, respectively) being 20° C. or more.

7 Claims, 12 Drawing Sheets

FE BASED HARD MAGNETIC ALLOY HAVING SUPER-COOLED LIQUID REGION

BACKGROUND OF THE INVENTION

1. Field of the Invention

The present invention relates to a Fe based hard magnetic alloy, especially to a Fe based hard magnetic alloy having a wide super-cooled liquid region, bearing a hard magnetism at room temperature after a heat treatment and being able to form into a bulky permanent magnet molded member.

2. Description of the Related Art

Some of conventional alloys composed of a plurality of elements have a wide temperature range to remain in a super-cooled liquid state prior to crystallization, so that these alloys can form glassy alloys. It is known in the art that this kind of glassy alloys can be molded into a bulky alloy far more thicker than thin films of amorphous alloys produced by a conventional melt quenching method.

While Fe—P—C amorphous alloys first produced in 1960's, (Fe, Co, Ni)—P—B alloys and (Fe, Co, Ni)—Si—B alloys first produced in 1970's, and (Fe, Co, Ni)—M (Zr, Hf, Nb) alloys and (Fe, Co, Ni)—M (Zr, Hf, Nb)—B alloys first produced in 1980's have been known as examples of amorphous alloy thin films, all of these alloys are inevitably produced by quenching at a cooling rate of the order of $10^5$ K/s, thereby films with a thickness of 50 μm or less were produced.

Accordingly, production of thick and bulky bonded magnets have been devised. Since these bonded magnets were formed, however, by a compression molding or injection molding after mixing a magnetic powder, produced by quenching a molten liquid mainly composed of $Nd_2Fe_{14}B$ phase, and an exchange spring magnetic powder of $Fe_3B$—$Nd_2Fe_{14}B_1$ alloys with a binder comprising a rubber or plastic, their magnetic properties became poor besides having a weak strength as materials. In the glassy metal alloys, on the other hand, an alloy with a thickness of several mm can be formed. Alloys with compositions of Ln—Al—TM, Mg—Ln—TM and Zr—Al—TM (wherein Ln denotes a rare earth element while TM denotes a transition metal) were discovered in the years of 1988 to 1991 as these sort of glassy alloys described above.

However, since these conventional glassy metal alloys did not exhibit any magnetism at room temperature, industrial applications as hard magnetic materials were largely restricted.

Therefore, R & D of glassy metal alloys capable of obtaining thick bulky alloys with hard magnetism at room temperature have been carried out.

The temperature interval $\Delta T_x$ in the super-cooled liquid area, that is, an interval between crystallization temperature ($T_x$) and glass transition temperature ($T_g$), or a numerical value of ($T_x-T_g$), is usually small in alloys with a variety of composition even when a state of super-cooled liquid area exists in the alloy. By considering the fact that conventional alloys have actually a poor ability for forming glassy metals and are of little practical values, the presence of alloys having a wide temperature range in the super-cooled liquid region and being capable of forming a glassy alloy with a single amorphous phase by cooling can overcome the limitation in thickness of thin films in the conventional amorphous alloys. In addition, If the amorphous single phase can be obtained, the crystal texture can be fine and uniform after heat treatment. It is largely noticeable from metallurgical interests. And discovery of glassy metal alloys that exhibit ferromagnetism at room temperature would be a key problem whether the alloys could be developed as industrial materials or not.

SUMMARY OF THE INVENTION

The object of the present invention is to provide a Fe based hard magnetic alloy having a wide temperature interval in the super-cooled liquid area, having a hard magnetism at room temperature, being able to be processed thicker than thin films of amorphous alloys obtained by a conventional melt quenching method, and having a high strength as materials along with an excellent hard magnetism after a heat treatment.

In one aspect, the present invention provides a Fe based hard magnetic alloy having super-cooled liquid region, comprising Fe as a major component and containing one or a plurality of elements R selected from rare earth elements, one or a plurality of elements M selected from Ti, Zr, Hf, V, Nb, Ta, Cr, Mo, W and Cu, and B, wherein the temperature interval $\Delta T_x$ in the super-cooled liquid region represented by the formula of $\Delta T_x=T_x-T_g$ (wherein $T_x$ and $T_g$ denote a crystallization temperature and glass transition temperature, respectively) is 20° C. or more.

The element M in the Fe based hard magnetic alloy according to the present invention contains Cr and $\Delta T_x$ is 40° C. or more.

The Fe based hard magnetic alloy having super-cooled liquid region according to the present invention may be represented by the following formula:

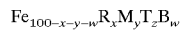

(wherein T is one or a plurality of elements selected from Co and Ni, with x, y, z and w representing composition ratios being in the range of $2 \leq x \leq 15$, $2 \leq y \leq 20$, $0 \leq z \leq 20$ and $10 \leq W \leq 30$ in atomic percentages, respectively)

The Fe based hard magnetic alloy having super-cooled region according to the present invention may be represented by the following formula:

(wherein T is one or a plurality of elements selected from Co and Ni with x, y, z, w and t representing composition ratios being in the range of $2 \leq x \leq 15$, $2 \leq y \leq 20$, $0 \leq z \leq 20$, $10 \leq W \leq 30$ and $0 \leq t \leq 0.5$ in atomic percentages, respectively, and the element L is one or a plurality of elements selected from Ru, Rh, Pd, Os, Ir, Pt, Al, Si, Ge, Ga, Sn, C and P.)

It is preferable that, in the Fe based hard magnetic alloy having super-cooled region according to the present invention, x representing the composition ratios in the composition formula of $Fe_{100-x-y-w}R_xM_yCo_zB_w$ or $Fe_{100-x-y-w-t}R_xM_yT_zB_wL_t$ is in the range of $2 \leq x \leq 12$ in atomic percentage.

It is also preferable that, in the Fe based magnetic alloy having super-cooled region according to the present invention, y representing the composition ratios in the composition formula of $Fe_{100-x-y-w}R_xM_yT_zB_w$ or $Fe_{100-x-y-w-t}R_xM_yT_zB_wL_t$ is in the range of $2 \leq y \leq 15$ in atomic percentage.

It is further preferable that, in the Fe based hard magnetic alloy having super-cooled region according to the present invention, z representing the composition ratios in the composition formula of $Fe_{100-x-y-w}R_xM_yT_zB_w$ or $Fe_{100-x-y-w-t}R_xM_yT_zB_wL_t$ is in the range of $0.1 \leq z \leq 20$ in atomic percentage.

In the Fe based hard magnetic alloy having super-cooled region according to the present invention, the element M in the composition formula of $Fe_{100-x-y-w}R_xM_yT_zB_w$ or $Fe_{100-x-y-w-t}R_xM_yT_zB_wL_t$ is represented by $(Cr_{1-a} M'_a)$, wherein M' is one or a plurality of elements selected from Ti, Zr, Hf, V, Nb, Ta, Mo, W and Cu and "a" is in the range of $0 \leq a \leq 1$. It is further preferable that, in the Fe based hard magnetic alloy represented by the composition formula above, "a" representing the composition ratio in the foregoing structure formula is in the range of $0 \leq a \leq 0.5$.

The Fe based hard magnetic alloy having super-cooled region described above may be subjected to a heat treatment in the present invention to precipitate a crystalline phase comprising one or two of α-Fe phase and $Fe_3B$ phase, and a crystalline phase comprising $Nd_2Fe_{14}B$ phase. It is preferable that the heat treatment described above is carried out by heating the Fe based hard magnetic alloy at 500 to 850° C. When the Fe based hard magnetic alloy according to the present invention is contaminated with a small amount of inevitable impurities such as oxides of rare earth elements in the production process, it should be considered to be within the technical concept of the present invention.

DESCRIPTION OF THE PREFERED EMBODIMENT

Figure 1:
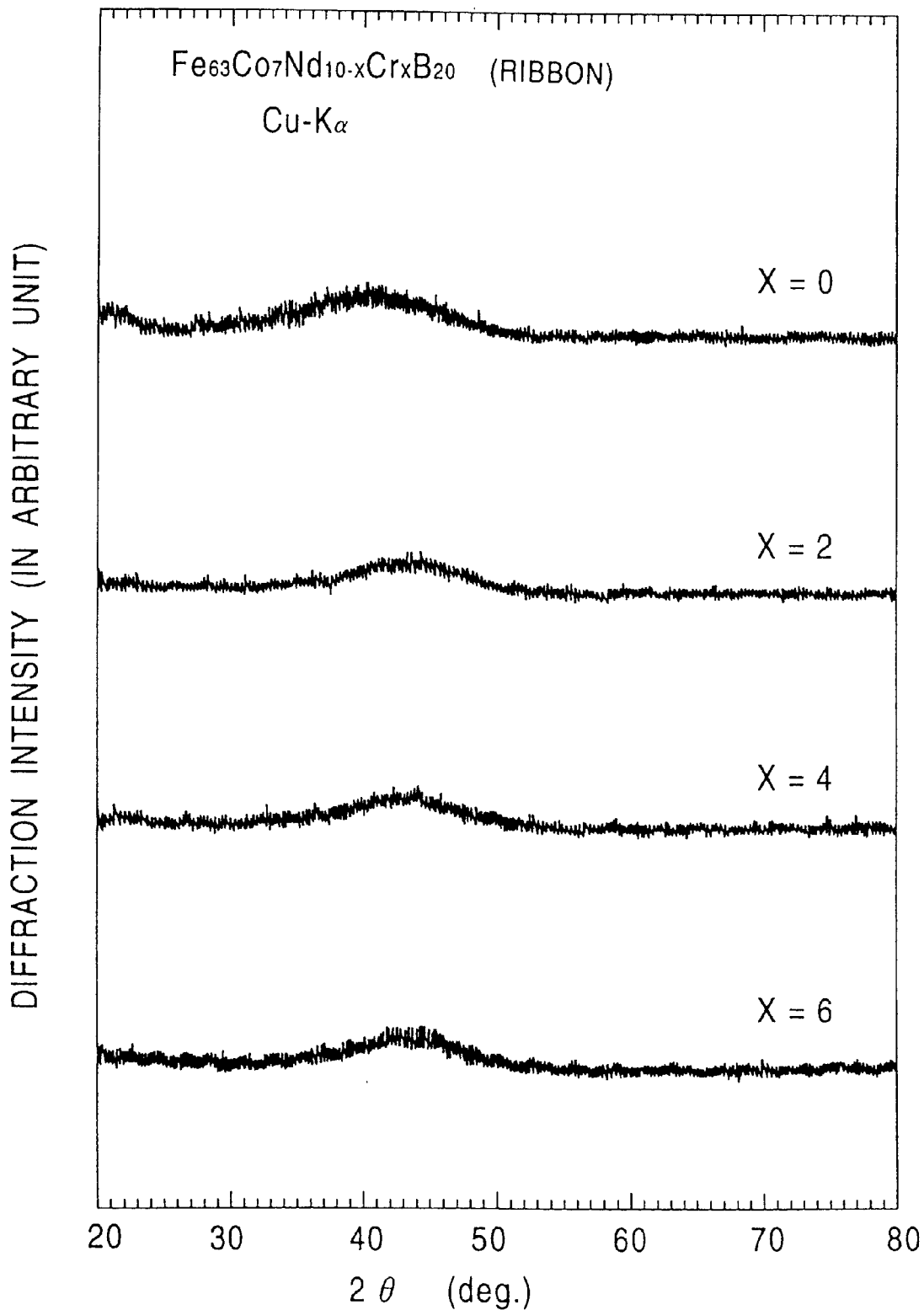
FIG. 1 shows X-ray diffraction patterns of the ribbon sample with a composition of $Fe_{63}Co_7Nd_{10-x}Cr_xB_{20}$ (x=0, 2, 4 or 6 atomic percentage) remaining in a quenched state after being produced by a single roll method.

The embodiments of the present invention will be now described referring to the attached drawings.

The Fe based hard magnetic alloy having a super-cooled liquid region (referred to Fe based hard magnetic alloy hereinafter) according to the present invention can be realized by a composition system with Fe as a major component and containing one or a plurality of elements R selected from rare earth elements and one or a plurality of elements M selected from Ti, Zr, Hf, V, Nb, Ta, Cr, Mo, W and Cu, in which a prescribed amount of B is added.

It is essential that the temperature interval $\Delta T_x$ in the super-cooled liquid region represented by the formula of $\Delta T_x = T_x - T_g$ (wherein $T_x$ and $T_g$ denote a crystallization temperature and glass transition temperature, respectively) is 20° C. or more. $\Delta T_x$ is preferably 40° C. or more when Cr is inevitably contained in the composition formula above. By bearing such $\Delta T_x$, an amorphous single phase can be readily obtained, thus obtaining a fine and uniform crystal texture after a heat treatment.

The Fe based hard magnetic alloy having super-cooled liquid region according to the present invention may be represented by the following formula:

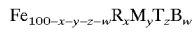

wherein T is one or a plurality of elements selected from Co and Ni and it is preferable that x, y, z and w representing composition ratios satisfies the conditions of $2 \leq x \leq 15$, $2 \leq y \leq 20$, $0 \leq z \leq 20$ and $10 \leq W \leq 30$ in atomic percentages, respectively.

The Fe based hard magnetic alloy having super-cooled liquid region according to the present invention may be represented by the following formula:

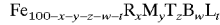

wherein T is one or a plurality of elements selected from Co and Ni with x, y, z, w and t representing composition ratios being in the range of $2 \leq x \leq 15$, $2 \leq y \leq 20$, $0 \leq z \leq 20$, $10 \leq W \leq 30$ and $0 \leq t \leq 5$ in atomic percentages, respectively, and the element L is one or a plurality of elements selected from Ru, Rh, Pd, Os, Ir, Pt, Al, Si, Ge, Ga, Sn, C and P.

It is preferable in the present invention that x representing the composition ratios in the composition formula of $Fe_{100-x-y-z-w}R_xM_yT_zB_w$ or $Fe_{100-x-y-z-w-t}R_xM_yT_zB_wL_t$ is in the range of $2 \leq x \leq 12$ in atomic percentage, with a more preferable range of $2 \leq x \leq 8$ in atomic percentage.

It is also preferable in the present invention that y representing the composition ratios in the composition formula of $Fe_{100-x-y-z-w}R_xM_yT_zB_w$ or $Fe_{100-x-y-z-w-t}R_xM_yT_zB_wL_t$ is in the range of $2 \leq y \leq 15$ in atomic percentage, with a more preferable range of $2 \leq y \leq 6$ in atomic percentage.

It is further preferable in the present invention that z representing the composition ratios in the composition formula of $Fe_{100-x-y-z-w}R_xM_yT_zB_w$ or $Fe_{100-x-y-z-w-t}R_xM_yT_zB_wL_t$ is in the range of $0.1 \leq z \leq 20$ in atomic percentage, with a more preferable range of $2 \leq z \leq 10$ in atomic percentage.

In the present invention, the element M in the composition formula of $Fe_{100-x-y-z-w}R_xM_yT_zB_w$ or $Fe_{100-x-y-z-w-t}R_xM_yT_zB_wL_t$ is represented by $(Cr_{1-a}M'_a)$, wherein M' is one or a plurality of elements selected from Ti, Zr, Hf, V, Nb, Ta, Mo, W and Cu characterized in that "a" is in the range of $0 \leq a \leq 1$. It is further preferable that, in the Fe based hard magnetic alloys represented by the composition formula above, "a" representing the composition ratio in the foregoing structure formula is in the range of $0 \leq a \leq 0.5$.

The Fe based hard magnetic alloy described above are preferably subjected to a heat treatment in the present invention to precipitate a crystalline phase comprising one or two of α-Fe phase and $Fe_3B$ phase, and a crystalline phase comprising $Nd_2Fe_{14}B$ phase. Since a mixed phase state comprising a soft magnetic phase in which α-Fe phase and $Nd_2Fe_{14}B$ phase are precipitated and a hard magnetic phase in which $Nd_2Fe_{14}B$ phase is precipitated is formed in the Fe based hard magnetic alloy, the alloy exhibits an exchange spring magnetic characteristic in which the soft magnetic phase is combined with the hard magnetic phase. The alloys bearing $\Delta T_x$ can be defined as a glassy alloy to distinguish it from amorphous alloys not bearing $\Delta T_x$.

It is preferable for obtaining a Fe based hard magnetic alloy with an improved coercive force and maximum integrated energy that the heat treatment described above is carried out by heating the foregoing Fe based hard magnetic alloy at 500 to 850° C., preferably at 550 to 750° C. The Fe based hard magnetic alloy after the heat treatment (after heating) is cooled by means of, for example, quenching with water.

(The Reason Why the Composition is Limited)

Fe or Co as a major component in the composition of the present invention is an element responsible for magnetism, which is important for obtaining a high saturated magnetic flux density and an excellent hard magnetic characteristic.

Since $\Delta T_x$ in the composition system containing a large amount of Fe tends to be too large, a proper adjustment of Co content in the composition system allows the system to have an effect for increasing the $\Delta T_x$ value. Moreover, concomitant addition of other elements makes it possible to increase the $\Delta T_x$ value without deteriorating the magnetic characteristic, along with an effect to increase the Curie point and decrease the temperature coefficient.

As an actual measure, the numerical value of z representing the composition ratio of T is preferably adjusted in the range of $0 \leq z \leq 20$ in atomic percentage in order to ensure a large $\Delta T_x$ value while, for the purpose of securely obtaining a $\Delta T_x$ value of larger than 20° C., the numerical value of z representing the composition ratio of T is preferably adjusted in the range of $2 \leq z \leq 10$ in atomic percentage.

Apart or all of Co maybe replaced with Ni, if necessary.

R represents one or a plurality of elements selected from rare earth elements (Y, La, Ce, Pr, Nd, Gd, Tb, Dy Ho and Er). The elements are effective for generating uni-axial magnetic anisotropy and for increasing cohesive force (iHc), the advantageous content of them being in the range of 2 atomic percentage or more and 15 atomic percentage or less. The content is more preferably in the range of 2 atomic percentage or more and 12 atomic content or less, most preferably 2 atomic percentage or more and 8 atomic percentage or less, for the purpose of keeping a high magnetism without decreasing the content of Fe while maintaining a magnetic balance with the coercive force (iHc).

M is the element selected from one or a plurality of Ti, Zr, Hf, V, Nb, Ta, Cr, Mo, W and Cu. These elements are effective for allowing an amorphous phase to grow, the content being in the range of 2 atomic percentage or more and 20 atomic percentage or less. For the purpose of obtaining a high magnetic characteristic, the content should be more preferably in the range of 2 atomic percentage or more and 15 atomic percentage or less, most preferably in the range of 2 atomic percentage or more and 6 atomic percentage or less. Cr is an especially effective element among these elements. While a part of Cr may be replaced with one or a plurality of elements selected from Ti, Zr, Hf, V, Nb, Ta, Mo, W and Cu, a high $\Delta T_x$ could be obtained when the composition ratio "a" for replacement is in the range of $0 \leq a \leq 1$. However, the range of $0 \leq c \leq 0.5$ is more preferable for securely obtaining a high $\Delta T_x$ value. Cu of the elements M has an effect for preventing coarsening of crystal grains as well as a function for improving the hard magnetic characteristic when a hard magnetism is given by crystallization.

Since B is highly effective for forming an amorphous phase, it is added in a range of 10 atomic percentage or more and 30 atomic percentage or less in the present invention. An amount of addition of less than 10 atomic percentage is not preferable because $\Delta T_x$ disappears while the amount of larger than 30 atomic percentage is also not preferable because the amorphous phase can not be formed. The more preferable range is 14 atomic percentage or more and 20 atomic percentage or less for obtaining higher ability of the amorphous phase formation and better magnetic characteristic.

One or a plurality of elements of Ru, Rh, Pd, Os, Ir, Pt, Al, Si, Ge, Ga, Sn, C and P represented by L can be further added to the composition descried above.

These elements can be added in a range of 0 to 5 atomic percentage in the present invention. Although the purpose of addition of these elements is to improve corrosion resistance, hard magnetic characteristic will be decreased when the amount of addition is outside of this range besides being not preferable since glass forming ability is deteriorated outside of this range.

For the purpose of producing the Fe based hard magnetic alloys having forgoing composition, at first powders or blocks (a part of which may be previously formed into an alloy) of each element are, for example, previously prepared. Then, these powders or blocks are mixed in the composition range described above followed by melting this mixed powder in a melting device such as a crucible in an atmosphere of inert gas such as Ar, or in vacuum or in an atmosphere of reduced pressure, to obtain a molten liquid of alloys in the composition range described above.

In the next step, glassy alloy in the composition range described above can be obtained by pouring this molten liquid of alloys into a mold or by quenching using a single roll method. These molded or rolled products can be formed into a molded member of a bulky Fe based hard magnetic alloy having a thickness thicker than amorphous alloy films obtained by conventional liquid quenching methods by a heat treatment. The term "single roll method" as used herein refers to a method for obtaining a ribbon of amorphous alloys, wherein the molten liquid is quenched by blowing it to a rotating metal roller.

The Fe based hard magnetic alloy thus obtained has a good magnetic characteristic since it does not contain any binders such as rubbers and plastics, together with an advantage that its material strength is high. The material has also an excellent corrosion resistance and rust preventing property.

EXAMPLES

Example 1

Production of Fe Based Hard Magnetic Alloy

A base alloy was produced by mixing pure metals of Fe, Co, Nd, Cr or Zr, and a crystal of pure boron in an atmosphere of Ar gas follower by an arc melting.

After melting this base alloy in a crucible, the molten liquid was subjected to a single roll method in an argon atmosphere of 60 cm Hg, by which the molten liquid was quenched by blowing it out of a nozzle with a diameter of 0.35 to 0.45 mm situated at the bottom of the crucible at an injection pressure of 0.50 kgf/cm$^2$ to a copper roll rotating at a speed of 4000 rpm, thereby a sample of a glassy metal alloy film with a width of 0.4 to 1 mm and a thickness of 20 to 30 μm was produced. The surface of the single roll of the single roll liquid quenching apparatus as used herein had been finished to a degree of #1500. The gap width between the single roll and the tip of the nozzle was 0.30 mm.

The sample obtained was assayed by X-ray diffraction and differential scanning calorimetry (DSC), observed under a transmission type electron microscope (TEM), and its magnetic characteristic was measured with a vibrating sample type magnetometer (VSM) at 15 kOe at room temperature.

FIG. 1 shows the result of X-ray diffraction analysis of ribbon samples of the glassy alloy with compositions of $Fe_{63}Co_7Nd_8Cr_2B_{20}$, $Fe_{63}Co_7Nd_6Cr_4B_{20}$ and $Fe_{63}Co_7Nd_4Cr_6B_{20}$. The result of X-ray diffraction analysis of a thin film comparative sample of the glassy metal alloy with a composition of $Fe63Co_7Nd_{10}B_{20}$ produced by the same method as in the samples is also shown in FIG. 1. X-ray diffraction analysis was carried out with a X-ray diffractometer (XRD) using Cu-Kα radiation.

The results of structure analysis with XRD shown in FIG. 1 typically showed broad patterns, indicating that all the samples have amorphous structures.

Figure 2:
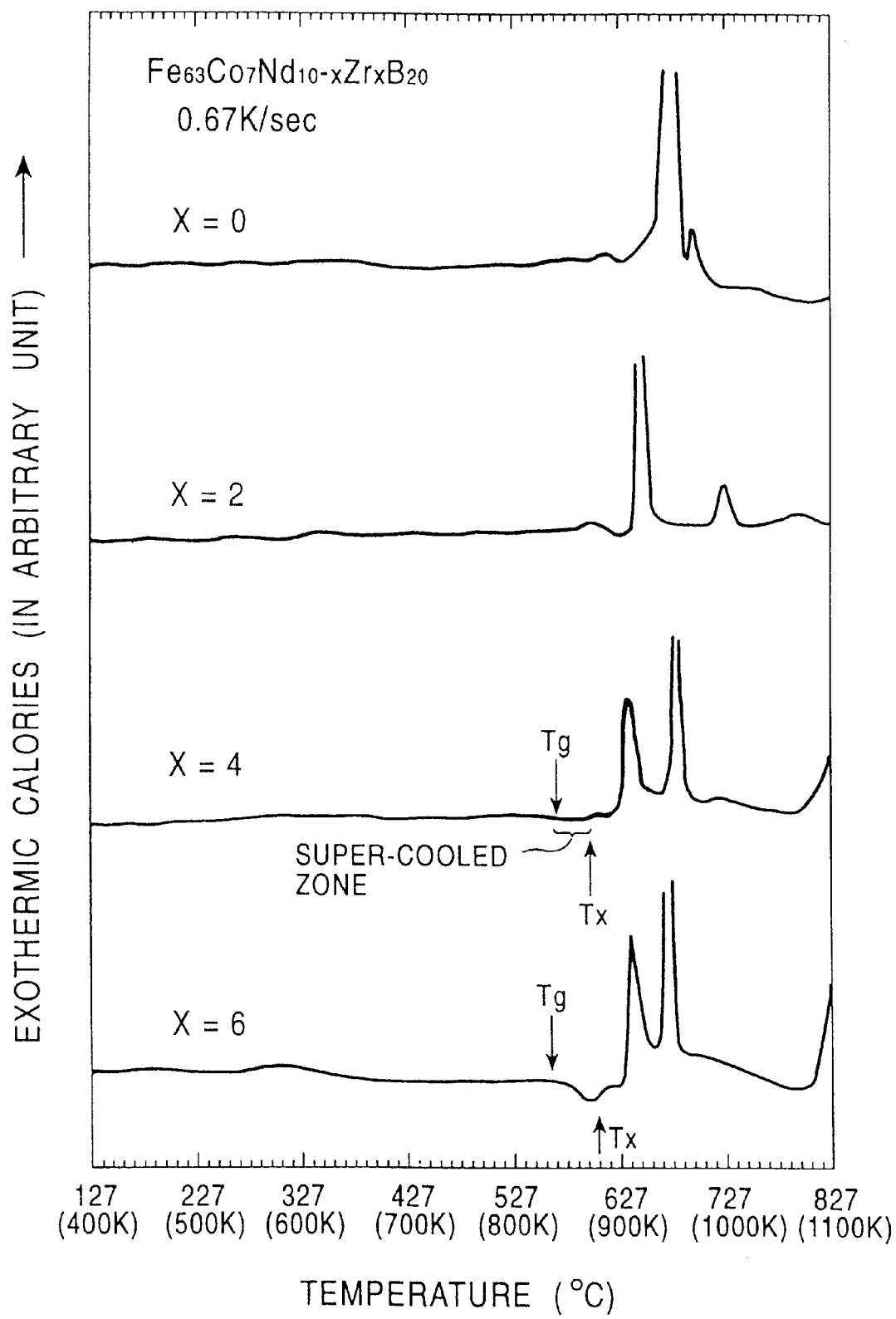
FIG. 2 shows DSC curves of the ribbon sample with a composition of $Fe_{63}Co_7Nd_{10-x}Zr_xB_{20}$ (x=0, 2, 4 or 6 atomic percentage) remaining in a quenched state after being produced by a single roll method.

FIG. 2 is a DSC curve obtained by heating a sample with a composition of $Fe_{63}Co_7Nd_{10-x}Z_xB_{20}$ in the temperature range of 127 to 827° C. with a heating rate of 0.67° C./sec.

In the ribbon sample of a glassy alloy with a composition of $Fe_{63}Co_7Nd_{10}B_{20}$, more than 3 exothermic peaks were observed, suggesting that crystallization had occurred in 3 steps. It was also revealed that, while no glass transition temperature $T_g$'s were observed below the crystallization initiation temperature $T_x$, an endothermic reaction considered to correspond to $T_g$ was observed at a temperature of $T_x$ or below when Zr was added and the amount of addtion of Zr was increased to 4% by atomic ratio.

Figure 3:
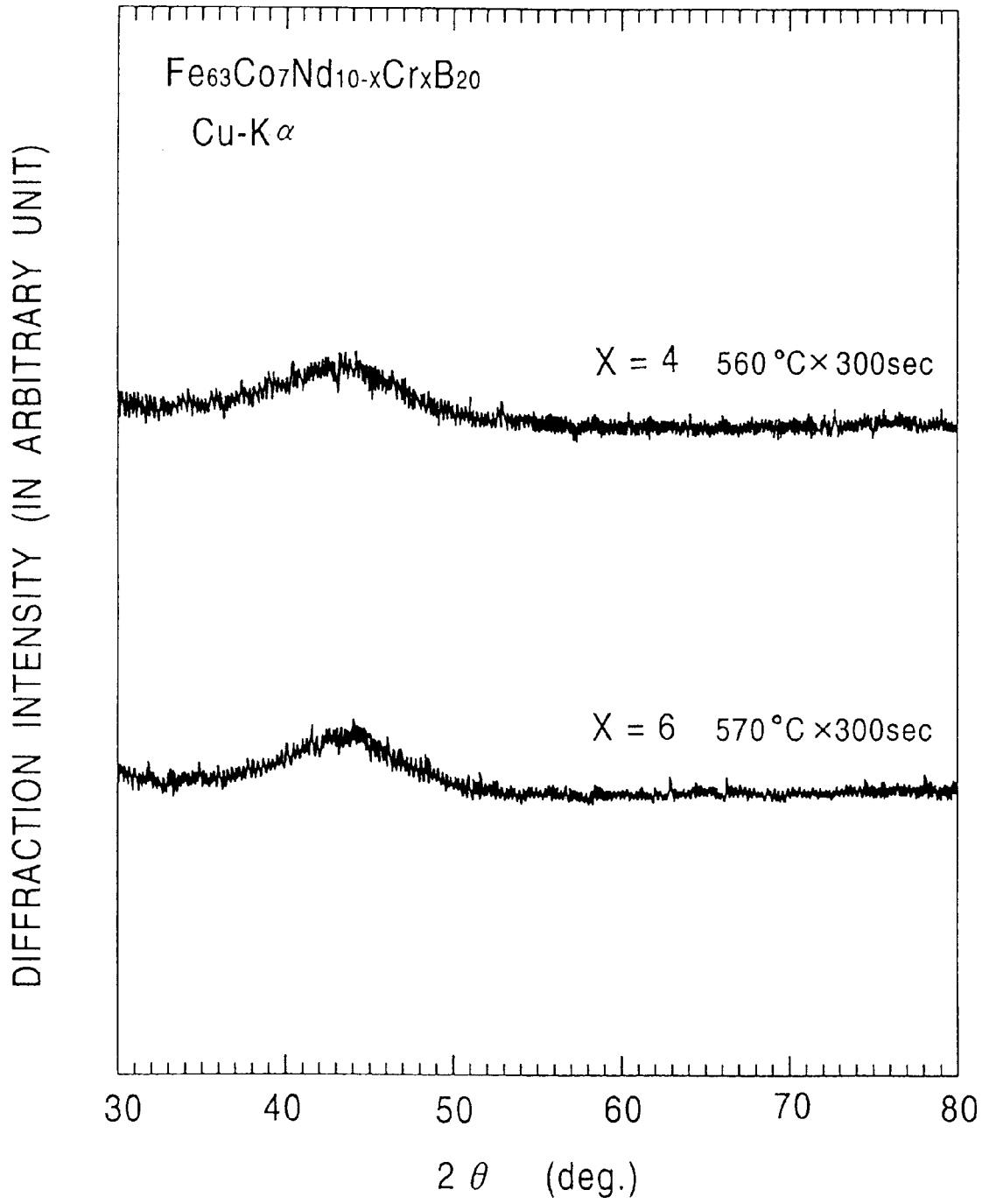
FIG. 3 is the results of X-ray diffraction assay after annealing a ribbon sample with a composition of $Fe_{63}Co_7Nd_6Cr_4B_{20}$ at 560° C. (833 K) for 300 seconds, and the results of X-ray diffraction assay after annealing a ribbon sample with a composition of $Fe_{63}Co_7Nd_4Zr_6B_{20}$ at 570° C. (843 K) for 300 seconds.

FIG. 3 shows a result of X-ray diffraction analysis after annealing a thin film sample of a glassy alloy with a composition of $Fe_{63}Co_7Nd_6Cr_4B_{20}$ at a temperature of 560° C. (833 K), a temperature considered to be immediately after the endothermic reaction, for 300 seconds, and a result of X-ray diffraction analysis after annealing a thin film sample of a glassy alloy with a composition of $Fe_{63}Co_7Nd_4Cr_6B_{20}$ at a temperature of 570° C. (843 K), a temperature considered to be immediately after the endothermic reaction, for 300 seconds.

As is evident from FIG. 3, any diffraction peaks corresponding to crystals were not observed in both of the thin film samples of glassy alloy with the compositions of $Fe_{63}Co_7Nd_6Cr_4B_{20}$ and $Fe_{63}Co_7Nd_4Cr_6B_{20}$ but showed broad peaks at around 2θ=45°, indicating that the endothermic reaction observed at a crystallization initiation temperature of $T_x$ or below was a endothermic reaction corresponding to a glass transition. From these results, it is made clear that the temperature interval Δ $T_x$ (=$T_x$–$T_g$) in the super-cooled liquid region is Δ $T_x$=30° C. when Zr content is 4 atomic percentage and Δ $T_x$=35° C. when Zr content is 6 atomic percentage, showing that the larger the amount of Zr addition is the wider becomes the temperature interval Δ $T_x$ in the super-cooled liquid region.

Figure 4:
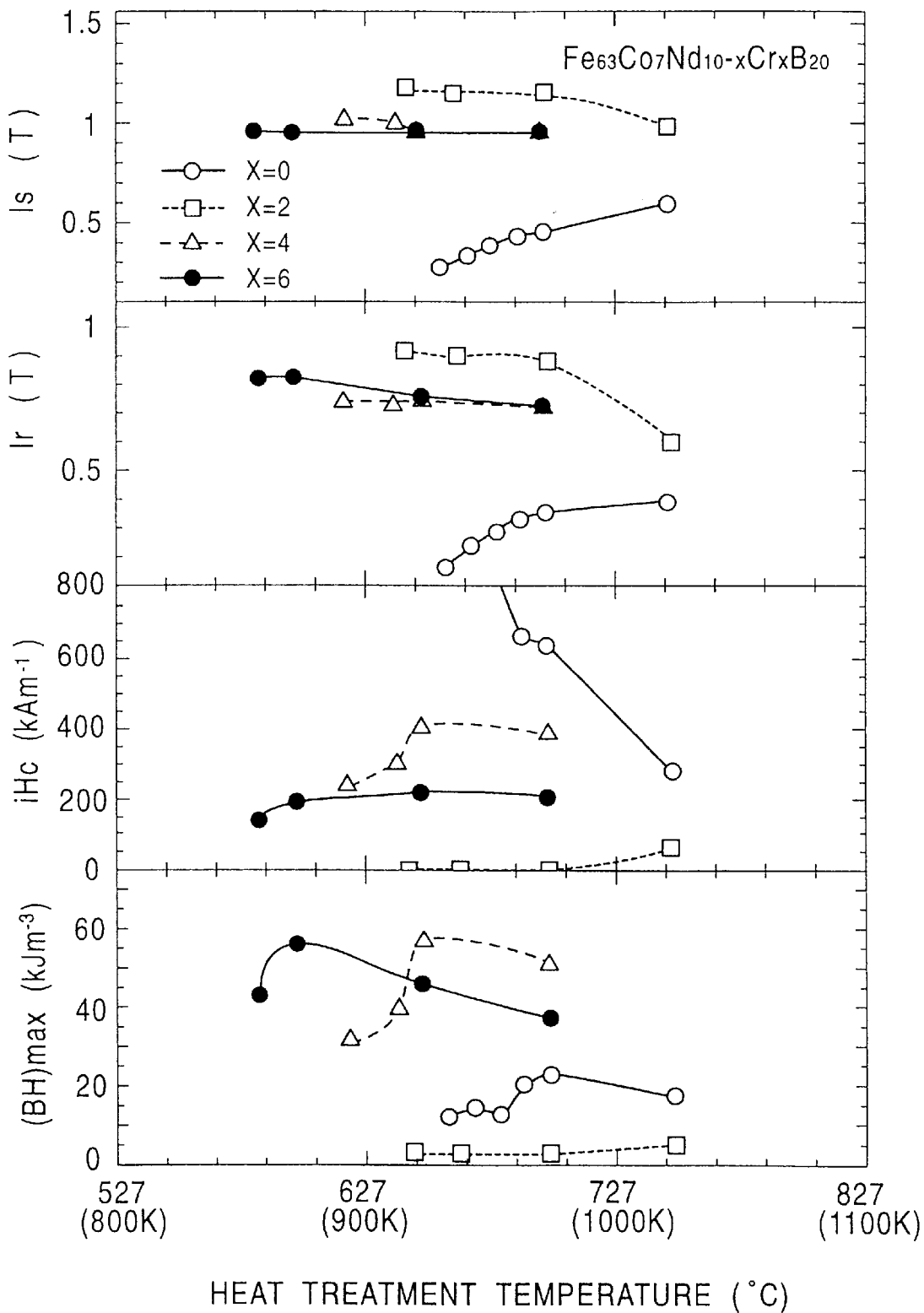
FIG. 4 shows a heat treatment temperature dependency of magnetic characteristics when a ribbon sample with a composition of $Fe_{63}Co_7Nd_{10-x}Cr_xB_{20}$ (x=0, 2, 4 or 6 atomic percentage) is heat-treated at a temperature of 560° C. to 900° C. for a retention time of 300 seconds.
Figure 5:
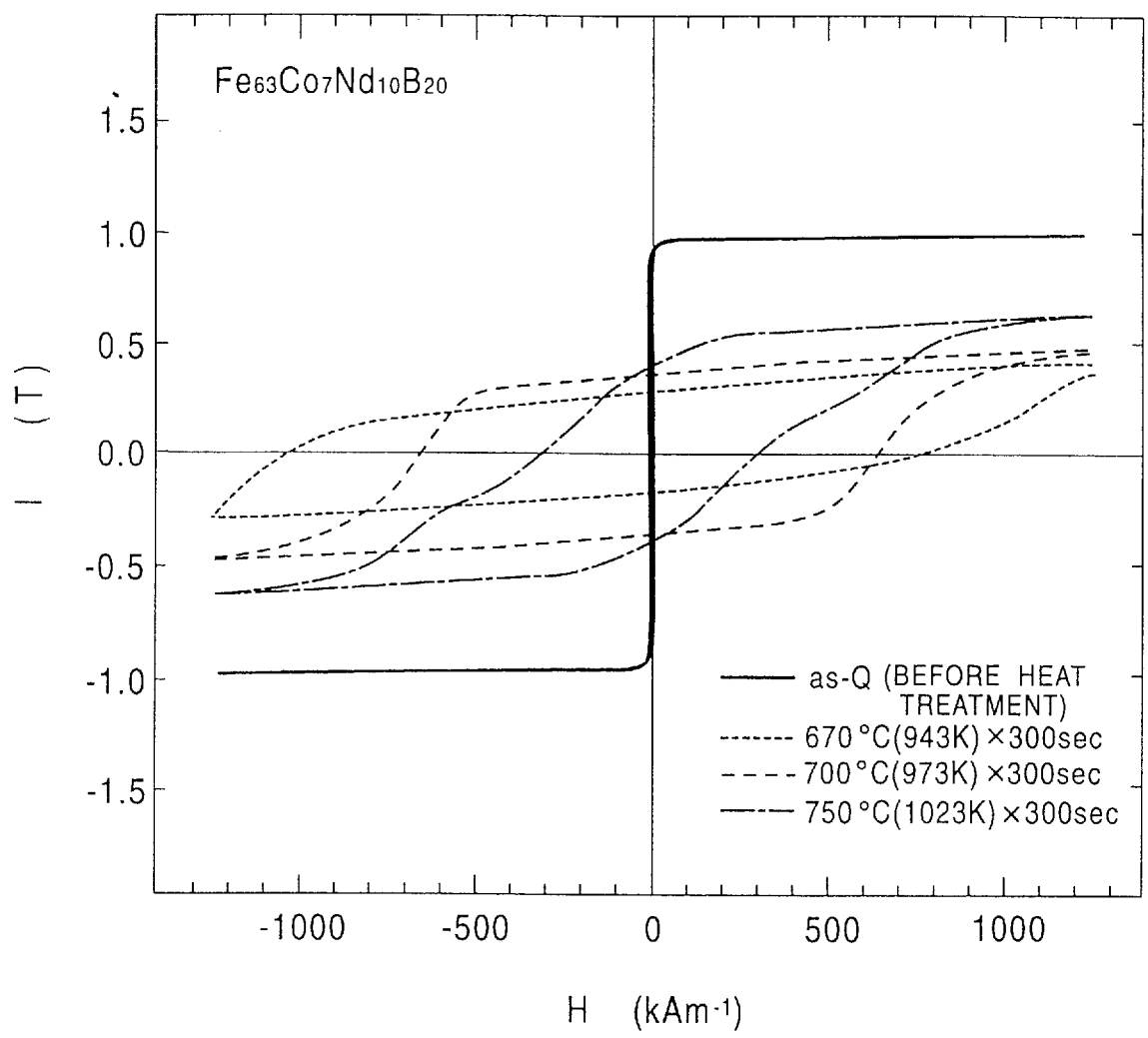
FIG. 5 shows I-H loops of ribbon samples with a composition of $Fe_{63}Co_7Nd_{10}B_{20}$ before and after the heat treatment.
Figure 6:
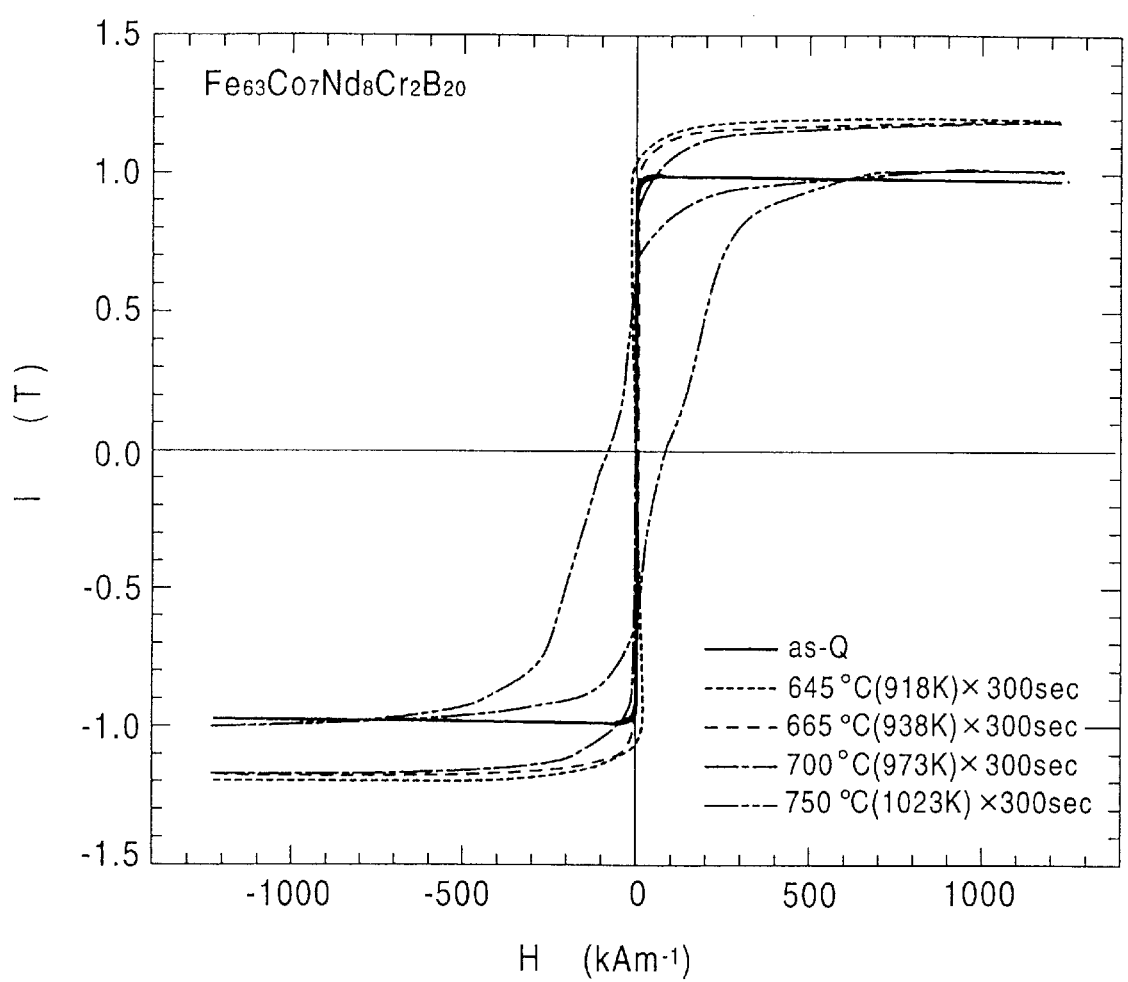
FIG. 6 shows I-H loops of ribbon samples with a composition of $Fe_{63}Co_7Nd_8Cr_2B_{20}$ before and after the heat treatment.
Figure 7:
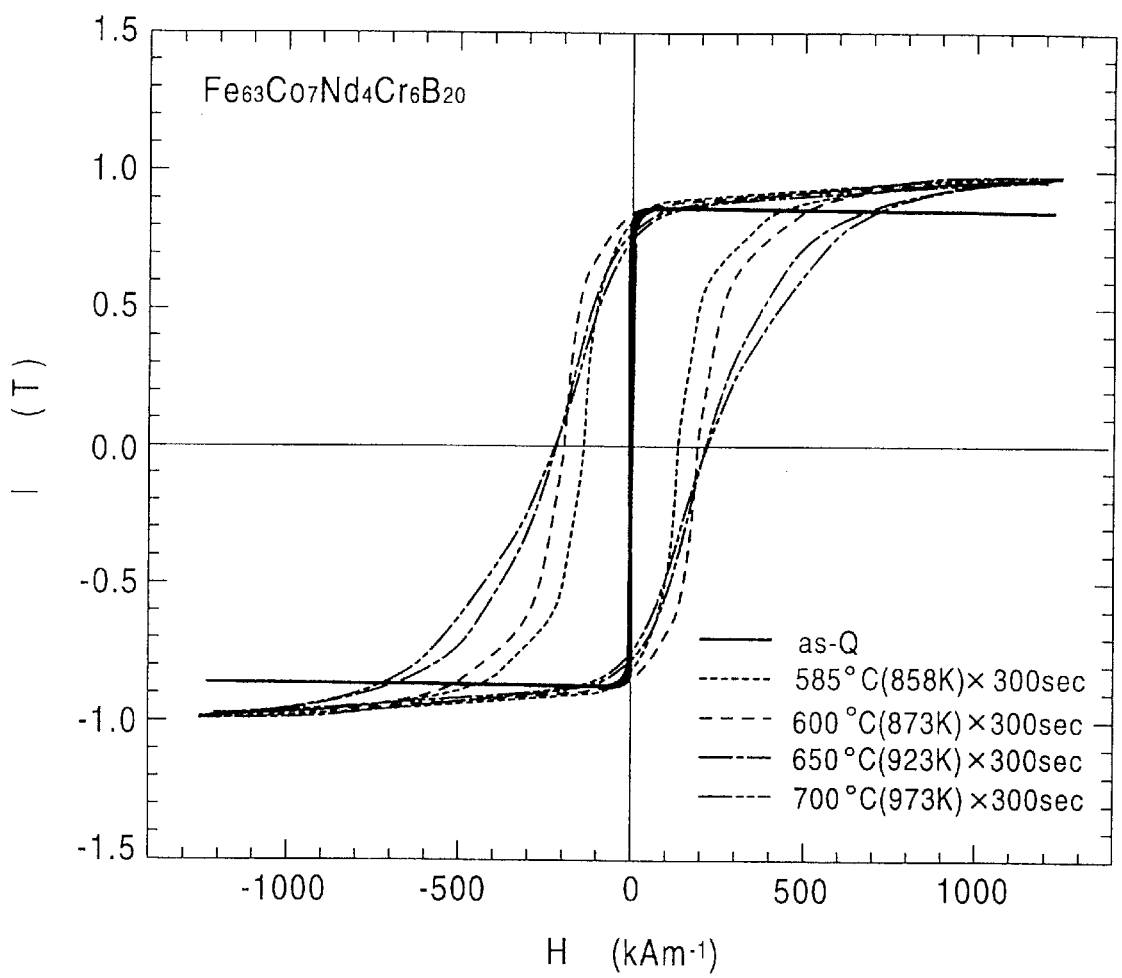
FIG. 7 shows I-H loops of ribbon samples with a composition of $Fe_{63}Co_7Nd_6Cr_4B_{20}$ before and after the heat treatment.
Figure 8:
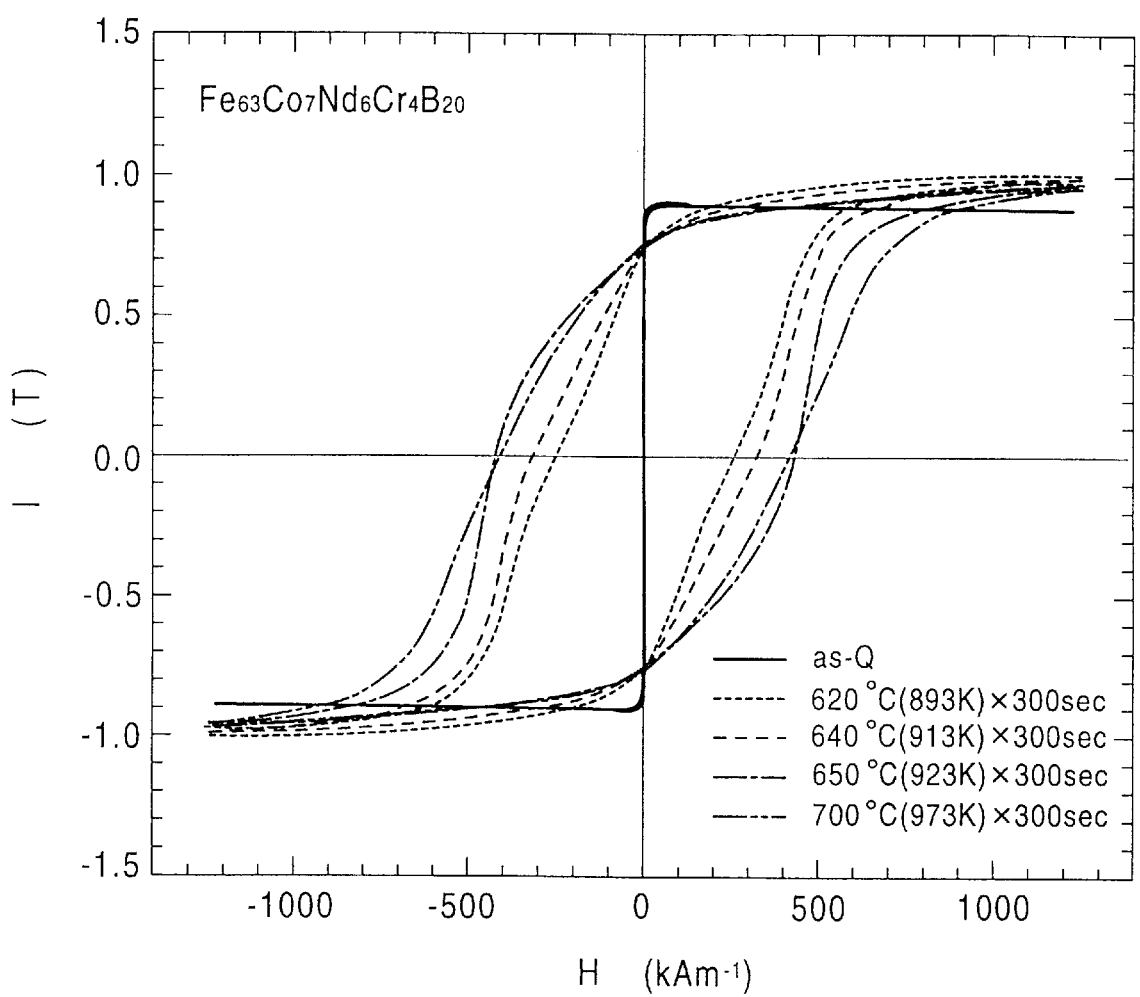
FIG. 8 shows I-H loops of ribbon samples with a composition of $Fe_{63}Co_7Nd_4Cr_6B_{20}$ before and after the heat treatment.

FIG. 4 shows the results of the heat treatment dependency of the magnetic characteristic when the samples with the compositions shown in FIG. 1 were heat-treated at 560° C. (833 K) to 900° C. (1173 K) for a retention time of 300 seconds using a muffle furnace.

The results in FIG. 4 show that the saturation magnetization becomes larger in the sample of the example in which Cr is added (x=2, 4 and 6) than in the sample of the comparative example (x=0) in which Cr is not added, the former showing a higher value by 1T or more. While the residual magnetism shows a tendency to be increased with the increment of the heat treatment temperature in every samples, the increase level is higher by 0.8T in the samples of the example in which Cr is added (x=2, 4 and 6) than in the samples of comparative example without Cr (x=0), indicating a very high remanence ratio. The coercive force is lower in the samples of the example in which Cr is added (x=2, 4, 6) irrespective of the amount of addition than in the samples of the comparative example in which Cr is not added (x=0), but the maximum energy product becomes large in the samples with x=4 and 6.

I-H loops of the ribbon samples of the glassy alloy with each composition in FIG. 1 determined before and after heat treatment are shown in FIG. 5, FIG. 6, FIG. 7 and FIG. 8.

As is evident from FIG. 4 to FIG. 8, the ribbon samples of the composition of $Fe_{63}Co_7Nd_{10}B_{20}$ that remain in quenched state without heat treatment show soft magnetism, indicating that hard magnetism is displayed by a crystallization heat treatment. From the fact that the precipitated phase has a very fine particle size at the initial stage of crystal precipitation, and that decrease in coercive force and deterioration of remanence ratio are observed with the increase of the heat treatment temperature, it is evident that growth of each precipitation phase, especially grain growth of the soft magnetic phase, has occurred. In the case of the ribbon samples of the glassy alloy with composition of $Fe_{63}Co_7Nd_{10-x}B_{20}Cr_x$ (x=4 and 6 atomic percentage), the sample remaining in the quenched state (glassy alloy state) without heat treatment exhibits soft magnetism, indicating that hard magnetism appears by the crystallization heat treatment. It is also shown that the saturation magnetization and remanent magnetization are very high while the coercive force is increased at the initial stage of crystal precipitation, which reaches to a maximum after the first stage of crystallization and slightly decreases thereafter. This fact indicate that the samples of the example display a larger maximum energy product than the samples of the comparative examples. It is also evident that the ribbon samples of the Fe based hard magnetic alloy in the example can form an exchange spring magnet comprising a soft magnetic phase and hard magnetic phase. The samples of the example with x=2 atomic percentage has a high saturation magnetization and remanent magnetization though their maximum energy product is low, indicating that these samples can also form a exchange spring magnet like the samples with x=4 and 6 atomic percentage.

Example 2

Production of Fe Based Hard Magnetic Alloy

A basic alloy was produced by mixing pure metals of Fe, Co, Nd, and Cr or Zr, and pure boron crystal in an argon atmosphere followed by an arc melting.

After melting this basic alloy in a crucible, ribbon samples of the glassy metal alloy having a width of 0.4 to 1 mm and a thickness of 20to 30 μm was produced by a single roll method as described in th production example 2. The samples obtained were assayed by X-ray diffraction and differential scanning calorimetric method (DSC) and observed under a transmission type electron microscope (TEM), and magnetic characteristics were measured with a vibrating sample type magnetometer (VSM) at 15 kOe and at room temperature.

After sealing the ribbon samples of glassy alloys with compositions of $Fe_{63}Co_7Nd_{10-x}Cr_xB_{20}$ (x=2, 4 and 6 atomic percentage) and $Fe_{58}Co_7Nd_{10}Zr_5B_{20}$ in a vacuum, the samples were heat treated at 585° C. (858 K) to 750° C. (1023 K) for a retention time of 300 seconds using a muffle furnace to determine the heat treatment temperature dependency of the magnetic characteristics. The results are shown in Table 2. For comparative purposes, a sample of ribbon alloy with a composition of $Fe_{63}Co_7Nd_{10}B_{20}$ was sealed in a vacuum and heat treated at 660° C. (933 K) to 750° C. (1023 K) for a retention time of 300 seconds using a muffle furnace to determine the heat treatment temperature dependency of the magnetic characteristics result is also shown in Table 1.

Table 1 also shows the densities of the ribbon samples of the glassy alloy remaining in a quenched state produced by a single roll method.

When the temperature interval $\Delta T_x$ in the super-cooled liquid region was investigated from the DSC curve obtained by heating each sample shown in Table 1 at a temperature range of 127 to 827° C. with a temperature increase rate of 0.67° C./sec., no $\Delta T_x$ was observed in the ribbon sample of the amorphous alloy of the comparative example with a composition of $Fe63Co_7Nd_{10}B_{20}$ while, in the ribbon samples of the glassy alloys with the compositions of $Fe_{63}Co_7Nd_8Cr_2B_{20}$, $Fe_{63}Co_7Nd_6Cr_4B_{20}$, $Fe_{63}Co_7Nd_4Cr_6B_{20}$, and $Fe_{63}Co_7Nd_4Zr_6B_{20}$, $\Delta T_x$'s were 51 K, 40 K, 52 K and 35 K, respectively, showing that the samples in which Cr have been added have wider temperature intervals $\Delta T_x$'s in the super-cooled liquid region.

Example 3

Production of Fe Based Hard Magnetic Alloy

Pure metals of Fe, Co, Nd and Cr, and pure crystal of boron were melted together in an atmosphere of Ar to produce a basic alloy.

After melting this basic alloy with high frequency electromagnetic wave in a quartz crucible, a bulk material with a diameter of 0.5 mm and a length of 50 mm was produced by a casting method in which the molten liquid was injected from a nozzle with a diameter of 0.35 to 0.5 mm placed at

TABLE 1

Magnetic characteristics of $Fe_{63}Co_7Nd_{10-x}Cr_xB_{20}$

|  | Heat treatment temperature (° C.) | Is (T) | Ir (%) | Ir/Is | iHc (kA/m) | (BH)$_{max}$ (kJ/m$^3$) | Density (10$^3$kg/) |
|---|---|---|---|---|---|---|---|
| $Fe_{63}Co_7Nd_{10}B_{20}$ | as-Q | 0.964 | 0.064 | 0.066 | 49.66 | 0.08 | 6.510 |
|  | 660 | 0.287 | 0.169 | 0.588 | 1051.22 | 11.73 |  |
|  | 670 | 0.349 | 0.232 | 0.664 | 1037.69 | 14.32 |  |
|  | 680 | 0.408 | 0.296 | 0.725 | 848.30 | 13.01 |  |
|  | 690 | 0.459 | 0.341 | 0.743 | 663.91 | 21.00 |  |
|  | 700 | 0.477 | 0.358 | 0.750 | 633.91 | 22.99 |  |
|  | 750 | 0.630 | 0.401 | 0.637 | 289.10 | 17.71 |  |
| $Fe_{63}Co_7Nd_8Cr_2B_{20}$ | as-Q | 0.993 | 0.083 | 0.084 | — | — | 6.771 |
|  | 645 | 1.194 | 0.931 | 0.780 | 5.51 | 2.93 |  |
|  | 665 | 1.177 | 0.908 | 0.772 | 6.22 | 3.34 |  |
|  | 700 | 1.180 | 0.893 | 0.757 | 7.12 | 3.80 |  |
|  | 750 | 1.028 | 0.613 | 0.596 | 77.52 | 5.98 |  |
| $Fe_{63}Co_7Nd_6Cr_4B_{20}$ | as-Q | 0.904 | 0.079 | 0.088 | — | — | 6.774 |
|  | 620 | 1.038 | 0.742 | 0.715 | 242.63 | 31.00 |  |
|  | 640 | 1.018 | 0.737 | 0.723 | 307.17 | 39.09 |  |
|  | 650 | 0.989 | 0.740 | 0.748 | 410.06 | 56.98 |  |
|  | 700 | 0.976 | 0.727 | 0.745 | 394.70 | 51.36 |  |
| $Fe_{63}Co_7Nd_4Cr_6B_{20}$ | as-Q | 0.864 | 0.069 | 0.080 | — | — | 6.777 |
|  | 585 | 0.979 | 0.825 | 0.843 | 144.99 | 42.84 |  |
|  | 600 | 0.964 | 0.818 | 0.848 | 197.11 | 56.23 |  |
|  | 650 | 0.969 | 0.763 | 0.788 | 224.17 | 46.04 |  |
|  | 700 | 0.992 | 0.745 | 0.751 | 216.93 | 38.13 |  |

In Table 1, "as —Q" represents a ribbon sample remaining in a quenched state without being subjected to a heat treatment, Ta represents the heat treatment temperature, $I_s$ represents saturation magnetization, $I_r$ represents remanent magnetization, $I_r/I_s$ represents a remanence ratio, $_iH_c$ represents coercive force and $(BH)_{max}$ represent maximum energy product.

The results shows that saturation magnetization is higher by about 1 T or more in the sample of the example in which Cr or Zr has been added than in the sample of the comparative example in which Cr or Zr has not been added. The sample of the example in which Cr or Zr has been added has a higher remanant magnetization than the sample of the comparative example in which Cr or Zr has not been added, increasing up to 0.6 to 0.9T showing a very high remenence ratio.

the top of a crucible at an injection pressure of 1.0 to 2.0 kgf/cm$^2$ into a copper mold with a dimension of 0.5 mm in diameter and 50 mm in depth in a vacuum (−76 cmHg).

Structure analysis and thermal properties of the samples obtained were assayed by X-ray diffraction and with a high resolution transmission type electron microscope (TEM), and with a differential scanning calorimeter (DSC), respectively. The magnetic properties were measured with a vibrating sample type magnetometer (VSM) at room temperature under an impressed magnetic field of 15 kOe.

Figure 9:
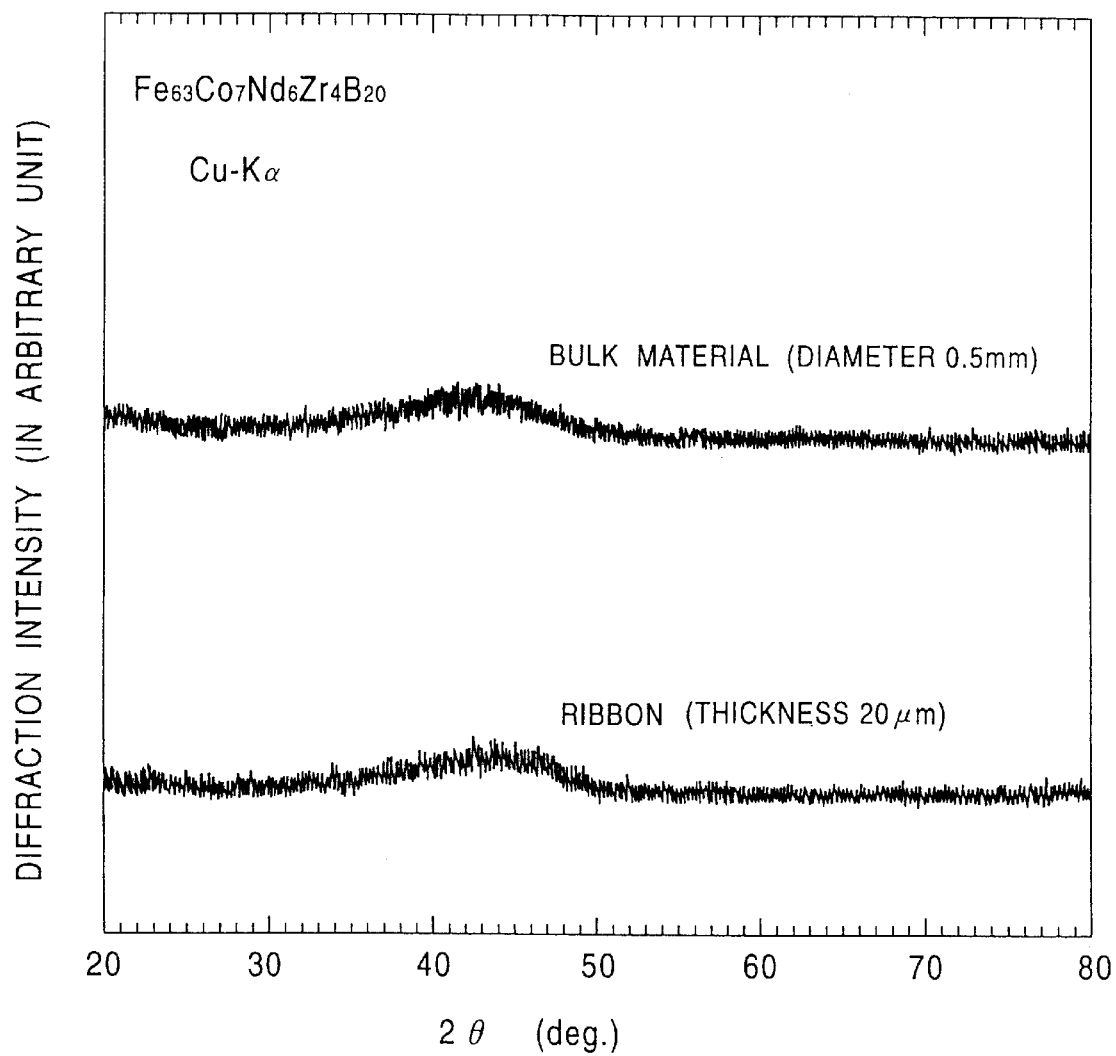
FIG. 9 shows the result of X-ray diffraction structure analysis of bulk materials of a glassy alloy with a composition of $Fe_{63}Co_7Nd_6Cr_4B_{20}$.

FIG. 9 shows the results of structure analysis of the bulk material with a composition of $Fe_{63}Co_7Nd_6Cr_4B_{20}$. The results of the structure analysis of the ribbon sample with a composition of $Fe_{63}Co_7Nd_6Cr_4B_{20}$ prepared by the same method as described in the foregoing example is also shown in FIG. 9 as a comparative example. X-ray diffraction assay was carried out with a X-ray diffractometer (XRD) using Cu-Kα radiation.

From the result of the structure analysis by XRD shown in FIG. 9, it can be concluded that all the samples assume amorphous structures because broad diffraction patterns were observed at around 2θ=40°.

Figure 10:
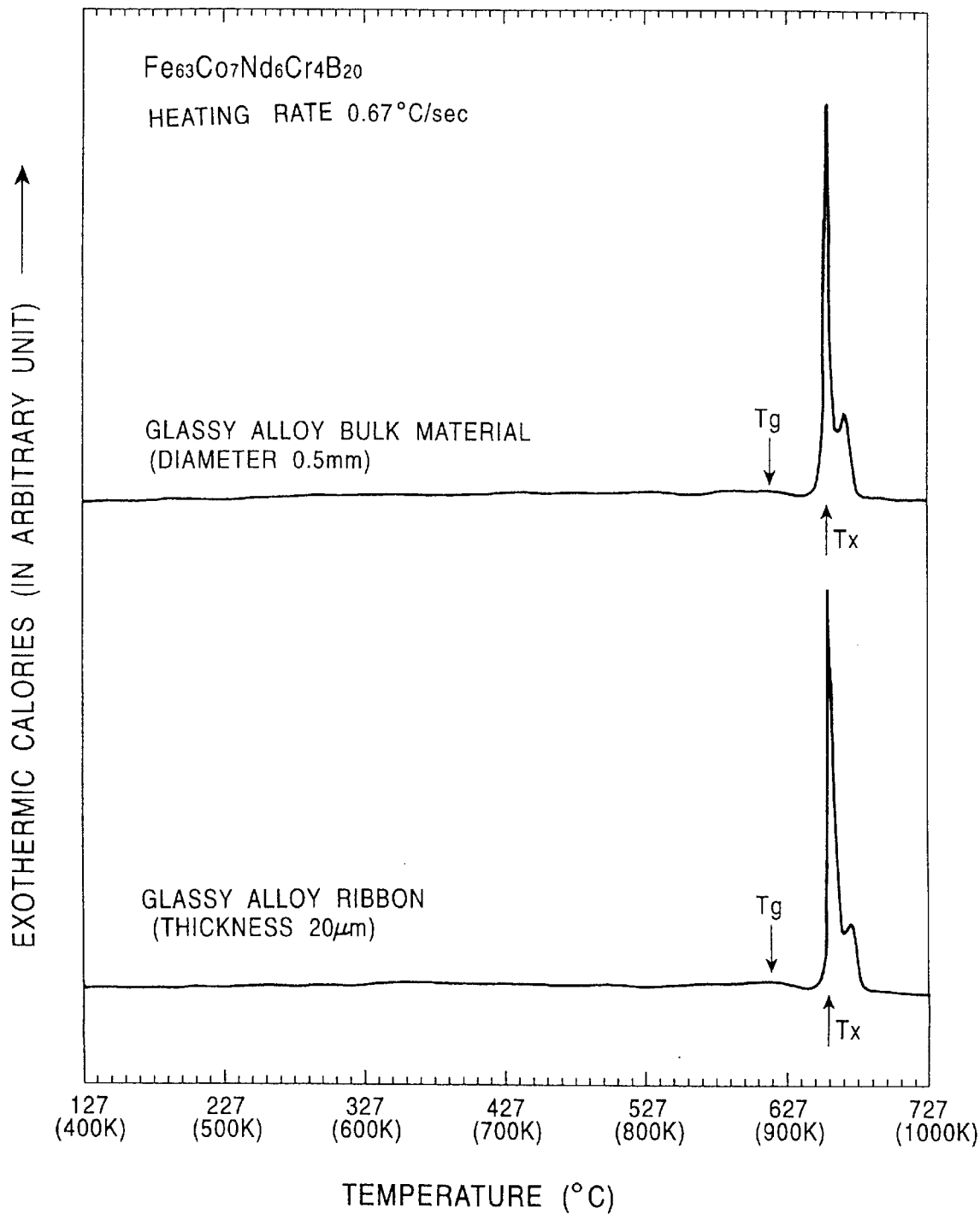
FIG. 10 is the results of thermal property investigations of the samples with a composition of $Fe_{63}Co_7Nd_6Cr_4B_{20}$ by DSC.

FIG. 10 is the results of the thermal property measurement by DSC of the bulk material with a composition of $Fe_{63}Co_7Nd_6Cr_4B_{20}$. The results of the thermal property measurement of the ribbon sample with a composition of $Fe_{63}Co_7Nd_6Cr_4B_{20}$ prepared by the same method as described in the foregoing example is also shown in FIG. 10 as a comparative example.

From the results of the thermal property measurement shown in FIG. 10, an endothermic reaction was observed at a temperature of below the crystallization initiation temperature in the DCS curve obtained, indicating that the sample with a composition of $Fe_{63}Co_7Nd_6Cr_4B_{20}$ displays a glass transition temperature $T_g$. This shows that the temperature interval $\Delta T_x$ ($=T_x-T_g$) of the super-cooled liquid region is 40° C., which is an identical value with the ribbon with a composition of $Fe_{63}Co_7Nd_6Cr_4B_{20}$.

Figure 11:
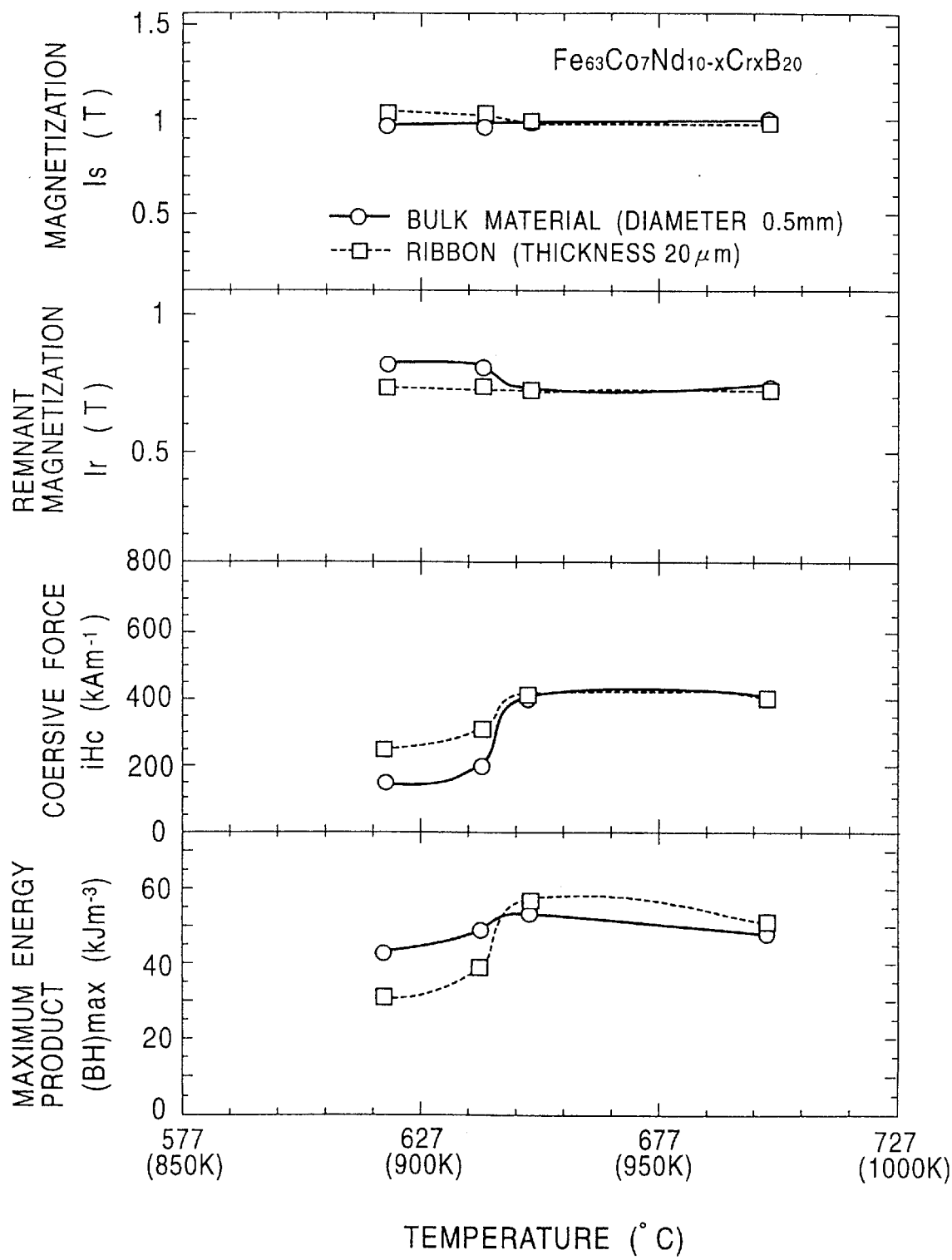
FIG. 11 is the result of investigations on the heat treatment temperature dependency of the magnetic characteristics of the samples with a composition of $Fe_{63}Co_7Nd_6Cr_4B_{20}$ after a heat treatment at 620° C. (893 K) to 700° C. (973 K) for a retention time of 300 seconds.

Magnetic properties and heat treatment temperature dependency of the Fe based hard magnetic alloy, which was prepared by a heat treatment of a bulk material with a composition of $Fe_{63}Co_7Nd_6Cr_4B_{20}$ at 620° C. (893 K) to 700° C. (973 K) for a retention time of 300 seconds after sealing the material in a vacuum, were investigated and the results are shown in FIG. 11 and Table 2. The results of the magnetic property and heat treatment dependency investigations of the thin film sample of the Fe based hard magnetic alloy with a composition of $Fe_{63}Co_7Nd_6Cr_4B_{20}$ prepared by the same method as in the foregoing example are also shown in the figure and table.

The results shown in FIG. 11 and Table 2 indicate that the saturation magnetization $I_s$ is approximately a constant value of 1 T irrespective to the heat treatment temperature that is nearly identical to the value of the ribbon sample. Remanent magnetization $I_r$ is also approximately a constant value of 0.7 T that is nearly identical to the value of the ribbon sample. Coercive force $_iH_c$ increases with the increment of the heat treatment temperature, showing a tendency to decrease after reaching to a maximum value of 394 kA/m at 650° C. (923K) which is the same tendency as that in a ribbon sample with the same composition. Maximum energy product $((BH)_{max})$ also increases with the increment of the heat treatment temperature, showing a tendency to decrease after reaching to a maximum value of 51 kJ/m³ at 650° C. (923 K) which is the same tendency as that in a ribbon sample with the same composition.

Figure 12:
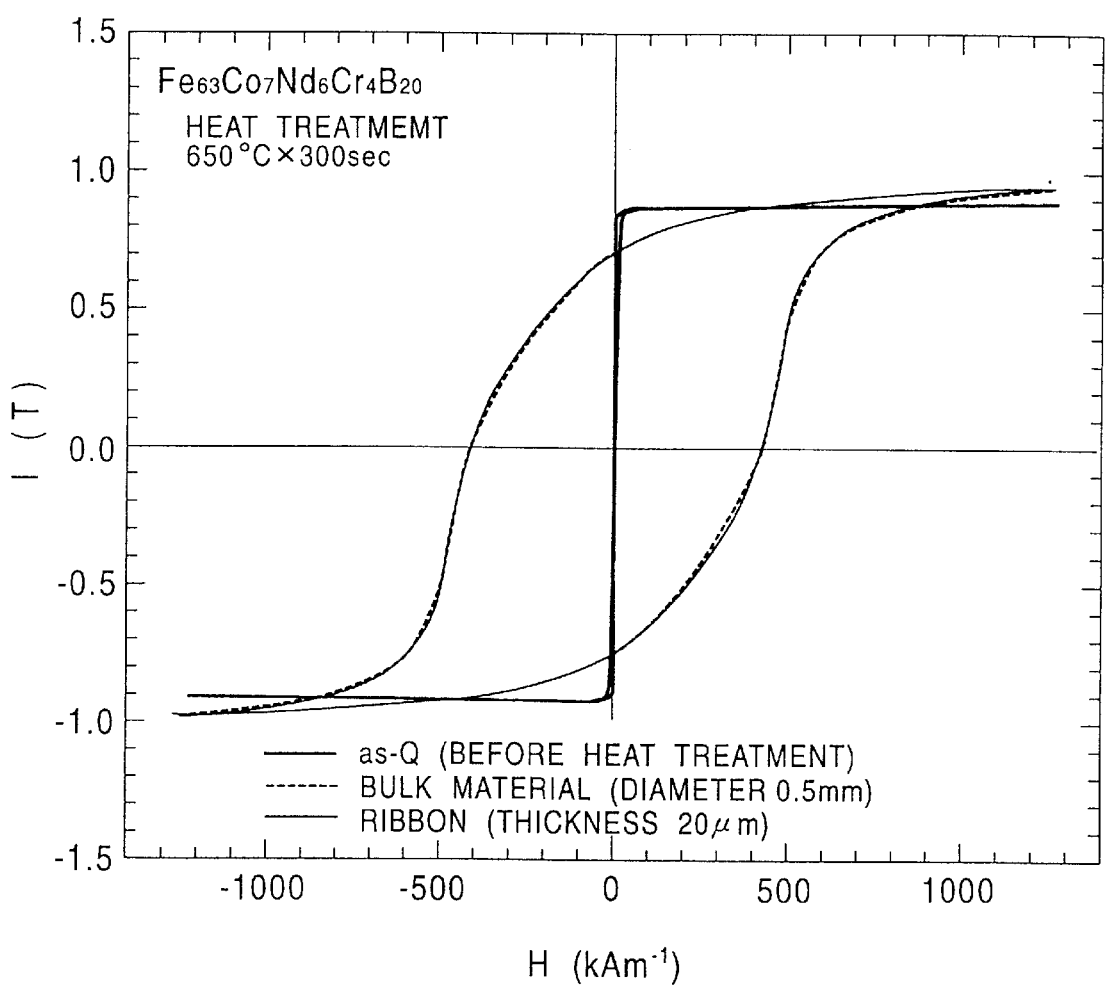
FIG. 12 is I-H hysteresis curves (I-H roops) of a bulky sample with a composition of $Fe_{63}Co_7Nd_6Cr_4B_{20}$ before a heat treatment and after a heat treatment at 650° C. for 300 seconds, and I-H hysteresis curves of a ribbon sample with the same composition after a heat treatment of 650° C. for 300 seconds.

FIG. 12 shows I-H hysteresis curves (I-H roops) of the bulk material shown in FIG. 9 before a heat treatment and after an optimum heat treatment. The result of I-H hysteresis curve measurement of the thin film sample with a composition of $Fe_{63}Co_7Nd_6Cr_4B_{20}$ prepared by the same method as in the foregoing example is also shown as a comparative example.

The results in FIG. 12 indicate that, while the bulk material after casting and before heat treatment shows a soft magnetic hysteresis curve, the curve turns into a hard magnetic hysteresis curve after heat treatment. It was revealed that the hysteresis curve after an optimum heat treatment resembles to that of the thin film sample with a composition of $Fe_{63}Co_7Nd_6Cr_4B_{20}$.

These results suggests that, while the bulk material with a composition of $Fe_{63}Co_7Nd_6Cr_4B_{20}$ having a glass transition $T_g$ below the crystallization initiation temperature and a super-cooled liquid region $\Delta T_x$ ($=T_x-T_g$) exhibits soft magnetism immediately after casting, the coercive force is increased by applying crystallization heat treatment and shows hard magnetism. This is indicative of the fact that the bulk material has the same thermal property and magnetic properties as those of the ribbon sample with a composition of $Fe_{63}Co_7Nd_6Cr_4B_{20}$, also indicating that the alloy composed of this composition has a very high amorphous forming ability as well as being a Fe based hard magnetic alloy with an excellent magnetic characteristics.

TABLE 2

| $Fe_{63}Co_7Nd_6Cr_4B_{20}$ Heat treatment 650° C. × 300 sec. | Glass transition Temperature $T_g$ (° C.) | Crystallization temperature $T_x$ (° C.) | Super-cooled liquid region $\Delta T_x$ (° C.) | Magnetization $I_s$ (T) | Remnant magnetization $I_r$ (T) | Coercive force iHc (kA/m) | maximum energy product $(BH)_{max}$ (kJ/m³) |
|---|---|---|---|---|---|---|---|
| Bulk material | 613 | 653 | 40 | 0.976 | 0.727 | 394 | 51.4 |
| Ribbon | 614 | 654 | 40 | 0.989 | 0.740 | 410 | 57.0 |

What is claimed is:

1. A Fe based hard magnetic alloy comprising Fe as a major component and containing one or a plurality of elements R selected from rare earth elements, one or a plurality of elements M selected from Ti, Zr, Hf, V, Nb, Ta, Cr, Mo, W, and Cu, and B, and represented by the following formula:

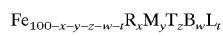

$$Fe_{100-x-y-z-w-t}R_xM_yT_zB_wL_t$$

wherein T is one or a plurality of elements selected from Co and Ni, with x, y, z, w and t being in ranges of $2 \leq x \leq 15$, $2 \leq y \leq 20$, $0 \leq z \leq 20$, and $10 \leq w \leq 30$ and $0 \leq t \leq 5$ in atomic percentages, respectively, and the element L is one or a plurality of elements selected from Ru, Rh, Pd, Os, Ir, Pt, Al, Si, Ge, Ga, Sn, C, and P, wherein a crystalline phase comprising one or two of α-Fe phase and $Fe_3B$ phase and a crystalline phase comprising $Nd_2Fe_{14}B$ are precipitated in said Fe based hard magnetic alloy.

2. A Fe based hard magnetic alloy according to claim 1, wherein the Fe based hard magnetic alloy has been heated in the range of 500° C. to 850° C.

3. A Fe based hard magnetic alloy according to claim 2, wherein x in said composition formula is in the range of $2 \leq x \leq 12$ in atomic percentage.

4. A Fe based hard magnetic alloy according to claim 2, wherein y in said composition formula is in the range of $2 \leq y \leq 15$ in atomic percentage.

5. A Fe based hard magnetic alloy according to claim 2, wherein z in said composition formula is in the range of $0.1 \leq z \leq 20$ in atomic percentage.

6. A Fe based hard magnetic alloy according to claim 2, wherein the element M in said composition formula is represented by $(Cr_{1-a}M'_a)$ and M' denotes one or a plurality of elements selected from Ti, Zr, Hf, V, Nb, Ta, Mo, W and Cu with "a" being in the range of $0 \leq a \leq 1$.

7. A Fe based hard magnetic alloy according to claim 6, wherein "a" in said composition formula is in the range of $0 \leq a \leq 0.5$.

* * * * *

UNITED STATES PATENT AND TRADEMARK OFFICE
CERTIFICATE OF CORRECTION

PATENT NO.    : 6,280,536 B1
DATED         : August 28, 2001
INVENTOR(S)   : Akihisa Inoue et al.

It is certified that error appears in the above-identified patent and that said Letters Patent is hereby corrected as shown below:

Column 12,
Lines 47-48, delete "≦" and substitute -- ≤ -- in all occurrences.
Line 61, delete "≦" and substitute -- ≤ -- in all occurrences.
Line 64, delete "≦" and substitute -- ≤ -- in all occurrences.
Line 67, delete "≦" and substitute -- ≤ -- in all occurrences.

Column 13,
Line 5, delete "≦" and substitute -- ≤ -- in all occurrences.

Column 14,
Line 3, delete "≦" and substitute -- ≤ -- in all occurrences.

Signed and Sealed this

Seventeenth Day of September, 2002

*Attest:*

*Attesting Officer*

JAMES E. ROGAN
*Director of the United States Patent and Trademark Office*